United States Patent [19]

Shepard

[11] 4,052,751
[45] Oct. 4, 1977

[54] GROUND FAULT INTERRUPTER CIRCUIT
[75] Inventor: Marshall Howard Shepard, Shrewsbury, Mass.
[73] Assignee: The Gillette Company, Boston, Mass.
[21] Appl. No.: 676,329
[22] Filed: Apr. 12, 1976
[51] Int. Cl.² .................................................. H02H 3/16
[52] U.S. Cl. .......................................... 361/50; 361/113
[58] Field of Search ..................... 317/53, 18 D, 18 R, 317/27 R; 340/253 Q; 324/51, 57 Q

[56] References Cited
U.S. PATENT DOCUMENTS

| 2,991,397 | 7/1961 | Place | 317/53 X |
| 3,356,939 | 12/1967 | Stevenson | 317/53 X |
| 3,794,884 | 2/1974 | Sircom | 317/53 X |
| 3,800,189 | 3/1974 | Montz | 317/53 X |
| 3,801,871 | 4/1974 | Loh | 317/53 X |
| 3,879,639 | 4/1975 | Sircom | 317/18 D |

Primary Examiner—J D Miller
Assistant Examiner—Patrick R. Salce
Attorney, Agent, or Firm—Richard A. Wise; Oistein J. Bratlie; Donald E. Mahoney

[57] ABSTRACT

A ground fault interrupter circuit is arranged to protect a person from electrical shock due to a ground fault by operating a switching circuit in response to a signal proportional to a reduction in Q of a high frequency resonant circuit.

4 Claims, 3 Drawing Figures

GROUND FAULT INTERRUPTER CIRCUIT

BACKGROUND OF THE INVENTION

1. Field of the Invention

This invention relates to apparatus for detecting ground faults and potentially dangerous current leakage to ground in AC equipment and protecting the user of the AC equipment against the hazards of an electrical shock and more particularly to a ground fault detecting device responsive to a change in Q of a high frequency tuned circuit.

2. Description of the Prior Art

A user of alternating current (AC) electrical appliances could be in danger of an electric shock due to a ground fault or a conductive path for leakage current from a power conductor to a conductor or terminal at ground potential. For this reason, ground fault interrupter circuits have been devised to protect a person from such a hazard. Some prior art ground fault interrupter circuits employ a suitable differential current transformer as a sensing circuit for determining the presence of a ground fault. The differential current transformer has a primary winding and a secondary winding wound on a common core. The primary winding is formed by a first conductor serially coupled between the line terminal of an AC power source and a load, $Z_L$, and a second conductor serially coupled between a neutral terminal of the AC power source and the load, $Z_L$. Typically, the neutral terminal of the source is connected to a source terminal at ground potential. Under operating conditions, load currents from the AC power source are substantially confined to the first and second conductors forming the primary winding to provide mutually cancelling magnetic fields in the core, whereby no electrical signal is induced on the secondary winding. However, the presence of a conductive path for leakage current from the first conductor of the primary winding to ground produces an uncancelled magnetic field in the core which in turn induces an electrical signal on the secondary winding. A detector circuit coupled to the secondary winding responds to the secondary winding signal to provide a signal suitable for operating a switching circuit for interrupting power conduction from the AC power source. A problem associated with employing a differential current transformer as a sensing circuit is a decrease in sensing circuit sensitivity in the presence of a conductive path for leakage current from the second conductor to ground.

Other ground fault interrupter circuits are arranged to couple a high frequency supervisory signal to a line conductor and monitor high frequency current conduction in a neutral conductor. A ground fault in the electrical equipment coupled to the line conductor provides an alternate path to ground for the high frequency supervisory signal thus reducing the high frequency current conduction in the neutral conductor. This reduction is sensed by complex circuitry and used to interrupt power conduction to the electrical equipment.

It is desired to produce a ground fault interrupter circuit to interrupt power conduction from an AC source in the presence of a conductive path to ground from either the first or second power conductor without employing a complex circuitry or a differential current transformer.

Referring to FIG. 1, there is shown a block diagram of a prior art ground fault interrupter circuit 10 serially coupled between a load $Z_L$ and an alternating current (AC) source 12 having output terminals 14, 16, and 18. The output terminals 14, 16, and 18 may be included in a typical wall outlet. A conductor 19 connects the source output terminals 16 and 18 to ground G or a conductor at a reference potential. A ground conductor $G_1$ may be coupled between source terminals 16 and 18 and a casing 21 enclosing the load $Z_L$. The serial connection of circuit 10 between the source 12 and the load $Z_L$ is provided by coupling circuit 10 input terminals 14 and 16, respectively, and circuit 10 output terminals 27 and 29 to the load $Z_L$ via line and neutral conductors L and N. The ground fault interrupter circuit 10 includes a sensing circuit 20 and a high power switch means 26 arranged to interrupt power conduction from the source 12 in the presence of undesired leakage current. As defined in this specification, leakage current is current conducted along undesired conductive paths from either the line conductor L to ground G or from the neutral conductor N to ground G.

The sensing circuit 20 includes a prior art differential current transformer 28 having a single turn primary winding comprising a first conductor 30 and a second conductor 31 wound on a common core 34. A multiturn secondary winding 32 is also wound on the core 34 and coupled to the high frequency oscillator circuit 22 and the low frequency amplifier circuit 23. The amplifier 23 is a prior art device arranged to provide an output signal in response to a signal at the source frequency. The oscillator 22 is arranged to operate, in the absence of leakage current, to provide a predetermined output signal at a frequency substantially higher than the frequency of the source 12 in response to suitable direct current bias signals from a source, not shown. The function of the oscillator 22 in the overall operation of circuit 10 will be explained below.

The primary winding first conductor 30 is connected between the interrupter circuit input terminal 15 and switch input terminal 39. The primary winding second conductor 31 is connected between the interrupter circuit input terminal 17 and switch input terminal 41. The switch 26 is normally operated in a closed position, in the absence of leakage current to provide a low impedance conductive path from the switch input terminals 39, 41 to the interrupter circuit output terminals 27, 29 in order to conduct power from the source 12 to the load $Z_L$. In the absence of leakage current, the differential current transformer 28 provides mutually cancelling magnetic fields in the core 34, whereby an electrical signal is prevented from being induced in the secondary winding 32. However, when leakage current causes uncancelled magnetic fields in the core 34, a portion of the source signal is induced in the secondary winding 32 which is in turn coupled to the low frequency amplifier 23. Thus, the differential current transformer 28 may be employed to sense leakage current or a deviation in current conducted by the conductor L relative to the conductor N and provide an output signal at the source frequency on the secondary winding 32. For example, any leakage current from the conductor L to ground G over a current conducting path Y is a current signal not conducted by the conductor N, thereby a portion of the source signal is induced in the secondary winding 32. The magnitude of the signal included in the secondary winding 32 is proportional to the magnitude of the leakage current and the admittance of the path Y. When the magnitude of the secondary winding signal coupled to the low frequency amplifier 23 indicates the presence of a dangerous level of leakage current, the low frequency amplifier 23 responds by providing an output signal suitable for activating the detector means 23 to operate the power switch 26 to interrupt power conduction from the source 12. Thus, if a person's body provided a current conducting path, Y, for leakage current between a poorly insulated portion of the conductor L and ground G, circuit 10 would operate to interrupt power conduction from the source 12.

Normally, the sensitivity of a sensing circuit employing the differential current transformer 28 is decreased in the presence of an undesired conductive path X between the conductor N and ground G since a portion of leakage current conducted along path Y to ground G would be conducted back to the conductor N along the conductive path X. Thus, if conductive paths X and Y were simultaneously present in an appliance, a deviation in current conducted by the conductor L relative to the current conducted by the conductor N would not provide a signal on the secondary winding 32 having a magnitude proportional to the leakage current along path Y. As a result, a potentially dangerous level of leakage current along path Y may not cause operation of the switch 26 to interrupt power conduction to the load $Z_L$. However, the ground fault interrupter circuit 10 includes the oscillator 22 and detector circuit 24 arranged to detect the presence of a low impedance conductive path X and cause the interruption of power conduction from the source 12 as further described in U.S. Pat. No. 3,879,639 entitled "Ground Fault Interrupters", issued to Richard C. Sircom on Apr. 1, 1975.

The high frequency oscillator 22 has a parallel tuned circuit comprising the impedance of the secondary winding 32 and a capacitor 36 coupled across the secondary winding 32. The parallel tuned circuit 32, 36 is arranged to be resonant at the output frequency of the oscillator 22 and to have a predetermined Q determining the magnitude of an oscillator output signal coupled to the detector 24. The magnitude of the oscillator output signal is substantially determined by the Q of the parallel tuned circuit 32, 36 when the circuit 32, 36 is included in a feedback loop of the oscillator 22. In the absence of the conductive path, X, the magnitude of the oscillator output signal is sufficient to cause the detector 24 to operate the power switch means 26 to conduct signals from the source 12 to the load $Z_L$. However, the presence of the current conducting path X provides a continuous conductive loop encircling the core 30 and decreasing the Q of the tuned circuit 32, 36 causing a proportionate decrease in oscillator output power. The loop includes conductor N, path X to the ground G, conductor 19 and the connection from terminal 16 to terminal 17 back to conductor N. If the admittance of the conductive path X is sufficient to cause the magnitude of the oscillator output signal coupled to the detector 24 to decrease below a predetermined level, the detector 24 provides an output signal selected to operate the power switch means 26 to interrupt conduction of signals from the source 12.

In summary, the prior art ground fault interrupter 10 includes the differential current transformer 28 arranged to provide a signal at the source frequency in the presence of a conductive path Y from the conductor L to ground G ultimately causing the operation of the switching circuit 26 to interrupt power conduction from the source 12 to the load $Z_L$. In addition, the ground fault interrupter 10 includes a high frequency oscillator 22 having a parallel tuned circuit comprising the impedance of the winding 32 and the capacitor 26 tuned to be resonant at the frequency of oscillation. The high frequency oscillator 22 provides an output signal having magnitude which is decreased in the presence of the conductive path X from the conductor N to ground G. When the oscillator output signal coupled to the detector 24 is decreased below a predetermined level, the detector 24 causes the switching circuit 26 to interrupt power condition from the source 12.

SUMMARY OF THE INVENTION

A ground fault interrpter circuit has been devised to interrupt signals at a first frequency conducted to a load from a source in the presence of a path to ground for leakage current. The ground fault interrupter circuit comprises means for generating signals at a second frequency including a parallel circuit with a predetermined Q at the second frequency. The parallel circuit is formed by a first capacitor coupled in parallel with first, second, and third conductors having an inductive impedance tuned to be resonant at the second frequency by the first capacitor. The first and second conductors have input terminals for receiving the signals at the first frequency and output terminals for coupling to the load. A second capacitor is coupled between the first and second conductors to provide a low impedance path for signals at the second frequency and a high impedance path for signals at the first frequency. The predetermined Q of the parallel circuit is reduced when signals at the second frequency are conducted along a continuous path encircling the core and including the first and second conductors, the first capacitor, and a path for the leakage current from the first conductor to ground. Switching means are coupled to the first and second conductors for interrupting signals conducted from the source to the load when the predetermined Q of the parallel circuit is reduced.

DESCRIPTION OF THE PREFERRED EMBODIMENT

Figure 1:
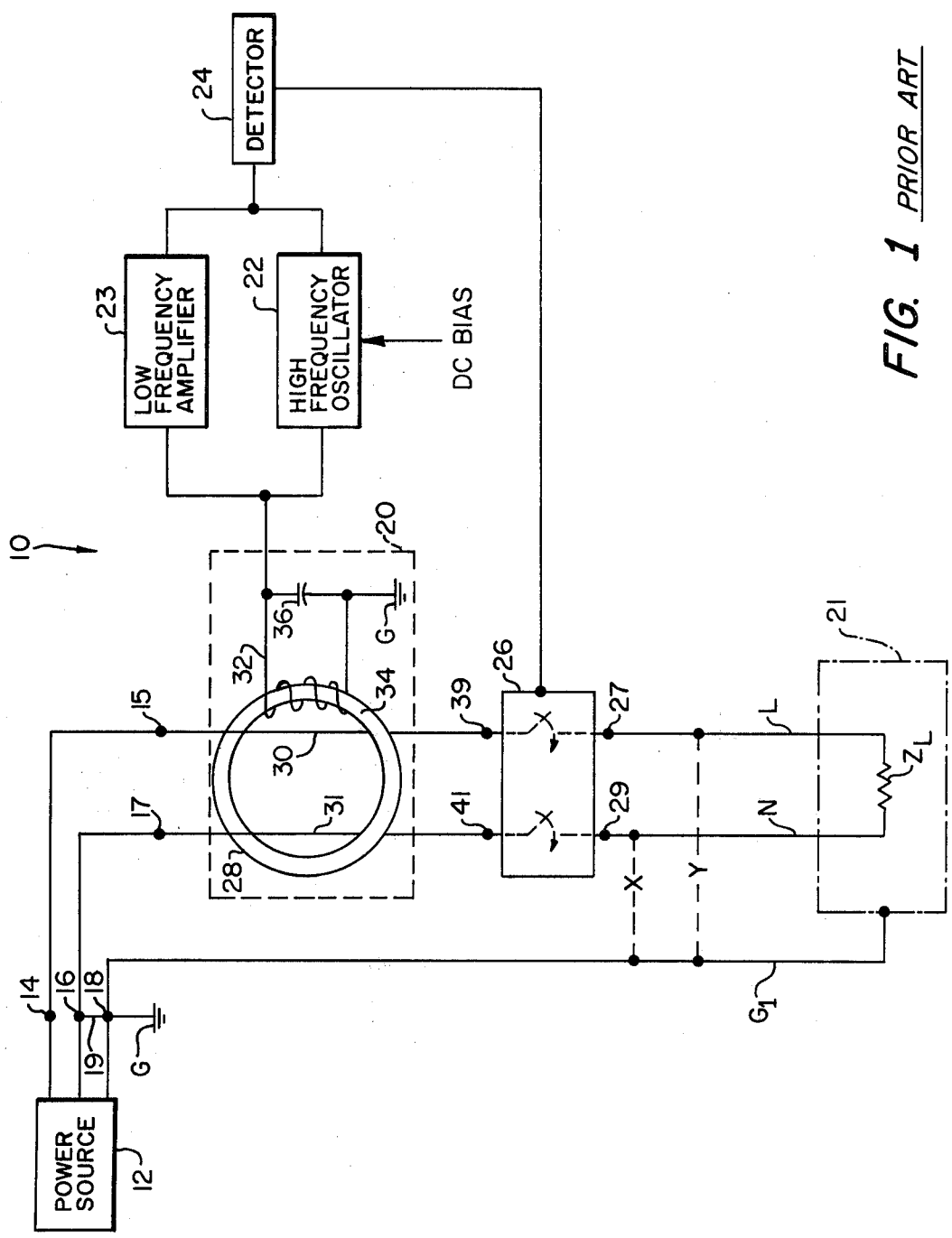
FIG. 1 is a block diagram of a prior art ground fault interrupter circuit.

Referring to FIG. 1, there is shown a block diagram of a ground fault interrupter circuit 40 arranged, according to the invention, to protect a person from a dangerous electrical shock due to leakage current without employing the differential current transformer 28 and the low frequency amplifier 23. All ground connections, power supplies, and multiple leads coupling the circuit components together and necessary for proper operation of the elements comprising the block diagram are not shown but will be readily understood by those skilled in the art. For convenience, the same numerals are used to indicate like elements in FIGS. 1 and 2.

The presence of leakage current from either the conductor N or the conductor L to the ground conductor $G_1$ or the source terminal 18 is detected by a sensing circuit 59 comprising a high frequency (h.f.) oscillator circuit 60 having a parallel resonant feedback loop 62. At the oscillator frequency, the feedback loop 62 includes a capacitor 65 coupled in parallel with an inductive impedance provided by multiple turns of first, second, and third conductors 64, 66, and 68, respectively, wound about a common core 69. The capacitor 65 is coupled across the windings of the first conductor 64. The first and second conductors or windings, 64 and 66, having input terminals 15 and 17 for receiving signals from the source 12 and output terminals 27 and 29 for coupling to the load $Z_L$. The oscillator 60 provides a h.f. output signal to an output terminal 71 connected to the conductor N and a high frequency detector circuit 70. The detector circuit 70 is arranged to respond to the magnitude of the oscillator output signal and provide a suitable output signal for operating the power switch 26 to interrupt power conduction from the source 12 to the load $Z_L$. As an example, the power switch 26 is shown serially coupled between the source 12 and sensing circuit 59. However, it is understood that a power switch, such as a relay, would interrupt current conduction to the load $Z_L$ if serially connected between the sensing circuit 59 and the load $Z_L$.

The oscillator circuit 60 is arranged as a blocking oscillator or a relaxation oscillator having an active element 67, such as a transistor. The magnitude of the oscillator output signal is proportional to the magnitude of the oscillator feedback signal conducted by the feedback loop 62. The feedback loop 62 determines the output frequency of the oscillator 60 and has a predetermined quality factor (Q) defined at 2 Pi times the ratio of the maximum stored energy to the energy dissipated per cycle at the frequency of resonance. Thus, the magnitude of the oscillator output signal coupled to the detector circuit 70 is proportional to the Q of the feedback loop 62. If the feedback loop Q and the magnitude of the oscillator output signal are decreased below a predetermined magnitude, the detector circuit 70 is arranged to respond by operating the power switch 26 to interrupt power conduction from the source 12 to the load $Z_L$.

The sensing circuit 59 is devised so that a current leakage path X, from the conductor N to the ground conductor G, permits the high frequency oscillator output signal to be conducted along a first continuous conductive loop including the neutral conductor N, path X, the ground conductor $G_1$, and back to the neutral conductor N via the connection 19 between terminals 16 and 18. The first current conducting loop encircles the core 69 and presents an impedance which reduces the Q of the feedback loop 62 and the magnitude of the oscillator output signal causing the power switch 26 to operate to interrupt current conduction to the load $Z_L$.

The sensing circuit 59 of the ground fault interrupter circuit 40 includes a capacitor 77 coupled across the conductors L and N for providing a low impedance path from the conductor 1 to the conductor N at the output frequency of the oscillator, and a high impedance path from the conductor L to the conductor N at the source signal frequency. The presence of a leakage current conductive path Y from the conductor L to the ground conductor $G_1$, permits the oscillator output signal to be conducted along a second continuous conductive loop including the conductor L, path Y, the ground conductor $G_1$, conductor 19, conductor N, and back to the conductor L via the capacitor 77. The second conductive loop presents an impedance which reduces the Q of the feedback loop 62 and ultimately causes the power switch 26 to operate to interrupt current conduction from the souce 12.

Unlike the sensing circuit 20 of the prior art ground fault interrupter 10 which requires a signal from the source 12 in order to sense the presence of conductive path Y, the sensing circuit 59 is arranged to sense the presence of either conductive path Y or conductive path X in response to a high frequency signal from the oscillator 60. In addition, the ground fault interrupter circuit 40 operates without employing the prior art differential current transformer 28 and the low frequency amplifiers 23.

Figure 2:
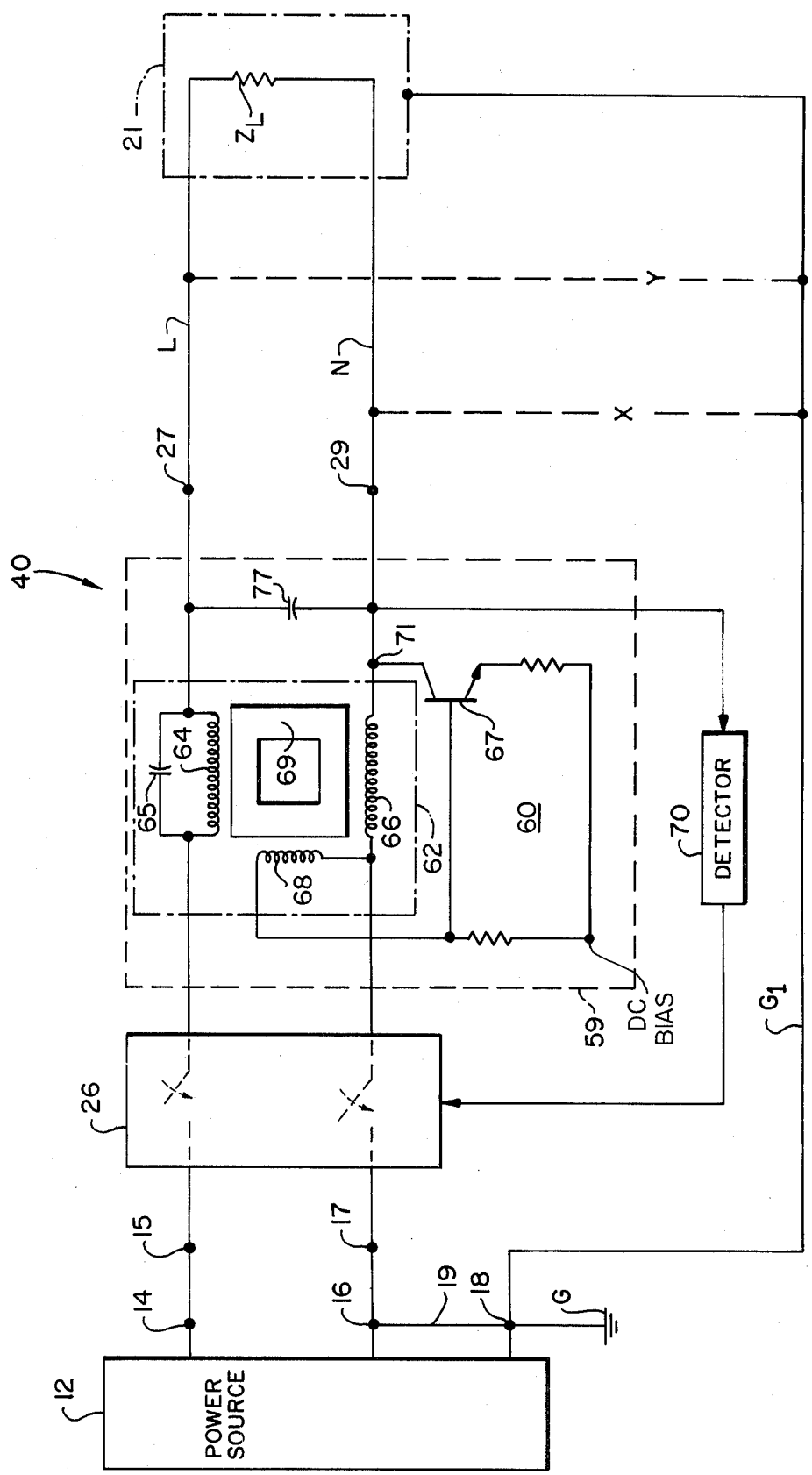
FIG. 2 is a block diagram of a ground fault interrupter circuit according to the invention.
Figure 3:
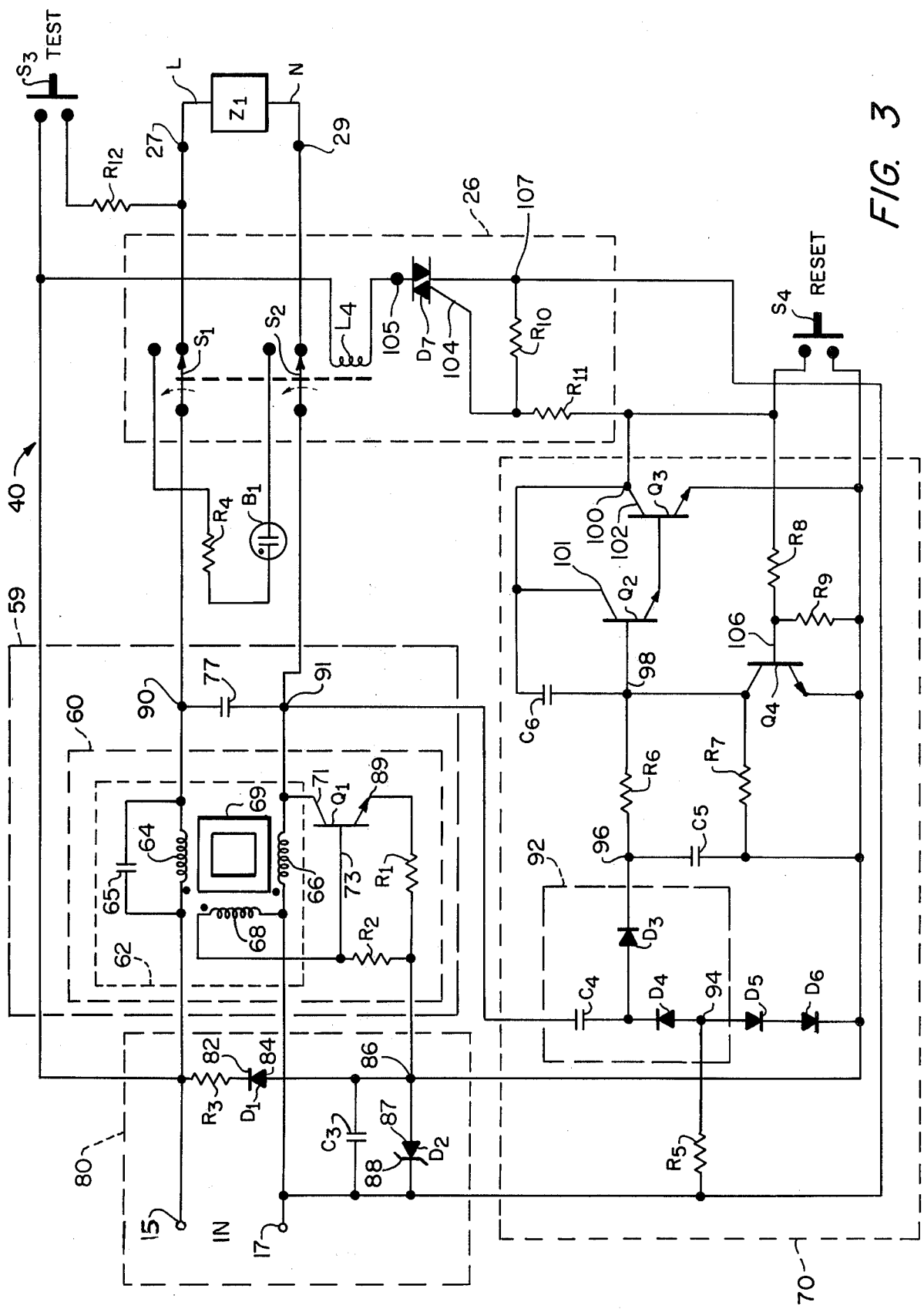
FIG. 3 is a more detailed schematic of a ground fault interrupter circuit according to the invention.

Referring to FIG. 3, there is shown a more detailed schematic of the ground fault interrupter circuit 40. The oscillator circuit 60 includes a transistor $Q_1$ and the feedback loop 62 connected between a collector terminal 71 and a base terminal 73. The feedback loop 62 comprises a parallel combination of windings 64 and capacitor 65 connected between terminal 15 and terminal 90 and a serial connection of windings 66 and 68 where windings 66 are connected between terminal 17 and terminal 91. The collector terminal 71 is connected to terminal 91 and one end of the windings 66. The base terminal 73 is connected to a dotted end of windings 68 and an end of resistor $R_2$. At a relatively high oscillator frequency, such as 10 KHz, the impedance of capacitor 77 is relatively low and capacitor 77 effectively couples windings 64 and 66 so that they respond as a single inductor coupled in parallel with the capacitor 65. A DC bias signal suitable for operating the detector and oscillator circuits, 70 and 60, is provided by a rectifier circuit 80 comprising resistor $R_3$, capacitor $C_3$, and diodes $D_1$ and $D_2$. The oscillator 60 responds to a negative DC bias voltage, for example −10 volts, applied to nodal terminal 86 to provide high frequency signal of several volts amplitude at nodal terminal 91. Therefore, the rectifier circuit 80 is designed to respond to a 60 Hz AC input signal coupled to input terminals 15 and 17 by providing a predetermined DC bias voltage at terminal 86. If desired, a DC voltage supply, such as a battery, may be substituted for the rectifier circuit 80 and the 60 Hz AC input signal for providing the negative DC bias voltage at terminal 86. In this example, the terminal 17 may be connected to a source neutral terminal and terminal 15 may be connected to a source line terminal, as shown in FIG. 2. The resistor $R_3$ is serially connected between circuit input terminal 15 and a cathode terminal 82 of the diode $D_1$ having an anode terminal 84 connected to the nodal terminal 86. The diode $D_1$ is arranged to rectify line voltage present at the circuit input terminal 15 and to provide the predetermined negative DC bias voltage at nodal terminal 86. The resistor $R_3$ is selected to limit current conducted to the nodal terminal 86. Capacitor $C_3$ is coupled between circuit input terminal 17 and the anode terminal 84 of the diode $D_1$ to provide filtering of the rectified voltage coupled to the nodal terminal 86. The voltage level at nodal terminal 86 is held substantially constant by the zener diode $D_2$ having a cathode terminal 88 coupled to the circuit input terminal 17 and an anode terminal 87 coupled to the nodal terminal 86. The negative DC bias voltage present at the nodal terminal 86 is coupled to an emitter terminal 89 of the transistor $Q_1$ in the oscillator circuit 60 via a gain limiting resistor $R_1$ and to a base terminal 73 of the transistor $Q_1$ via resistor $R_2$. The sensitivity of the circuit 40 is determined by the resistance of $R_1$. For example, the resistance of resistor $R_1$ is selected to cause a termination of the operation of the oscillator circuit 60 when a 5 milli-amp current signal is conducted to ground along either path X or path Y, as described above.

The high frequency signal at nodal terminal 91 is coupled to a capacitor $C_4$ and diodes $D_3$ and $D_4$ arranged as a voltage doubler 92. The output signal from the voltage doubler 92 combines with the DC voltage present at nodal terminal 94 and filtered by capacitor $C_5$ to provide a DC bias voltage at terminal 96 determined by the amplitude of the signal at nodal point 91. For example, resistor $R_5$ and diodes $D_5$ and $D_6$ are arranged, as known in the art, to provide $-8.8$ volts at terminal 94 when the voltage at terminal 86 is $-10$ volts. If a predetermined DC bias voltage is present at nodal terminal 96 and if transistor $Q_4$ is in an "OFF" state, sufficient bias current is conducted by resistor $R_6$ to base terminal 98 of transistor $Q_2$ causing the transistors $Q_2$ and $Q_3$ to operate in an "ON" state. Transistor collector terminals 101 and 102 are connected to terminal 100 so that the transistors $Q_2$ and $Q_3$ provide a selected negative bias voltage at terminal 100 when they are operated in the "ON" state. A capacitor $C_6$ is connected from base terminal 98 to terminal 100 to increase the switching time of the transistors $Q_2$ and $Q_3$ so as to minimize the effect of transitory noise causing false tripping of circuit 40.

A resistor $R_{11}$ is serially connected between terminal 100 and a gate terminal 104 of a Triac $D_7$. The Triac $D_7$ is a bidirectional triode thyristor semiconductor device which operates as an electrical switch in response to a negative bias voltage applied at the gate terminal 104 to provide a conductive path for AC signals from a Triac first terminal 105 to a Triac second terminal 107. Thus, the Triac $D_7$ responds to a negative voltage at terminal 100 by switching from an "OFF" or non-conducting state to an "ON" or conducting state, whereby input terminal 15 is connected to input terminal 17 via relay coil $L_4$. A portion of the 60 Hz input signal is then applied across relay coil $L_4$ causing normally open relay contacts $S_1$ and $S_2$ to close and the input signal or line voltage at input terminals 15 and 17 to be conducted to output terminals 27 and 29 and the load $Z_L$.

In the presence of an undesired and dangerous current conducting path or leakage current from either conductor L or N, to a point at ground or reference potential, the Q of the oscillator feedback loop 62 is decreased by an amount proportional to the resistive component of the impedance of the undesired conductive path. The oscillator 59 is arranged so that a reactive component of the impedance of the undesired conductive path will alter frequency of oscillation while having only a small effect on amplitude. If the Q of the oscillator feedback loop 62 is reduced below a predetermined level, the magnitude of the output signal from the oscillator circuit 60 will decrease causing a decrease in bias voltage at nodal terminal 96 as the capacitor $C_5$ discharges through the resistor $R_6$, $R_7$ and the base terminal 98 of the transistor $Q_2$. After the capacitor $C_5$ has finally discharged, the transistors $Q_2$ and $Q_3$ are deprived of base current causing them to operate in an "OFF" state, removing bias voltage from terminal 100 and Triac gate terminal 104. The Triac $D_7$ responds to the lack of bias at gate terminal 104 by switching from an "ON" to an "OFF" state preventing current conduction from terminal 105 to terminal 107, whereby current conduction through the relay coil $L_4$ is terminated and the relay contacts $S_1$ and $S_2$ open to disconnect the load $Z_L$ from the 60 Hz input signal.

In the absence of output signals from the oscillator circuit 60, the bias voltge at terminals 96 and 98 approaches the magnitude of the negative supply voltage. In this example, when the voltage at terminal 98 is less than $-8.8$ volts, the voltage required to bias $Q_2$ and $Q_3$ "ON", current is conducted from terminal 100 to a base terminal 106 of the transistor $Q_4$ via resistor $R_8$, since, with $Q_3$ "OFF" the voltage at terminal 100 is now greater than the voltage at terminal 86. The transistor $Q_4$ responds to the current signal applied to base terminal 106 by operating in the "ON" state and providing a suitable negative bias voltage to the base terminal 98 of transistor $Q_2$ for holding the transistors $Q_2$ and $Q_3$ in the "OFF" state. The transistor $Q_4$ remains in the "ON" state even when operation of the oscillator 59 resumes after the relay contacts $S_1$ and $S_2$ open to disconnect the dangerous current conductive path from the circuit 40. After the oscillator 59 resumes operation, the bias voltage at terminal 96 begins to increase. However, the Triac $D_7$ remains in an "OFF" state, since the transistor $Q_4$ is operated in an "ON" state and diverts current from the base terminal 98 of the transistor $Q_2$ causing the bias voltage at terminals 100 and 104 to remain positive with respect to terminal 86.

After the dangerous current conducting path has been removed, the relay coil $L_4$ is re-energized to close the relay contacts $S_1$ and $S_2$ by momentarily depressing a reset button or switch $S_4$ to provide a conductive path from terminal 86 to terminal 100. The $-10$ volts present at terminal 86 is momentarily applied to terminal 100 causing the transistor $Q_4$, to operate in the "OFF" state and the Triac $D_7$ to operate in the "ON" state. When the depressed switch $S_4$ is released or opened, the bias voltage at terminal 100 remains negative since the bias voltage at terminal 98 is now suitable for operating the transistors $Q_2$ and $Q_3$ in an "ON" state. Thus, the transistor $Q_4$ and its associated circuitry operates as a latching network preventing the relay contacts to close until the switch $S_4$ is momentarily depressed.

The circuit 40 may include a serial connection of a current limiting resistor $R_4$ and bulb $B_1$ between relay contacts $S_1$ and $S_2$ so that the bulb $B_1$ is energized when the relay contacts $S_1$ and $S_2$ are operated in an open postion to disconnect the load $Z_L$ from the AC input signal. Thus, the resistor $R_4$ and bulb $B_1$ are connected to the relay contacts $S_1$ and $S_2$ to provide a visual indication of the presence of a dangerous current conducting path which causes the relay contacts $S_1$ and $S_2$ to open.

Means for testing the operation of circuit 40 include a test circuit comprising a serial connection of switch $S_3$ and a resistor $R_{12}$ between input terminal 15 and output terminal 27. The resistor $R_{12}$ simulates the impedance of a dangerous current conduction path to ground. The test circuit $S_3$, $R_{12}$ is operated by depressing switch $S_3$ to connect terminal 27 to terminal 15 via resistor $R_{12}$, whereby, the relay contacts $S_1$ and $S_2$ are caused to open, in the manner described above, since at the oscillator frequency, capacitor 77 effectively couples terminal 27 to terminal 17 at ground or reference potential.

A ground fault interrupter circuit 40 has been described including a sensing circuit 59 using a high frequency oscillator circuit 60 having a parallel resonant feedback loop 62 with a predetermined Q and a capacitor 77 providing a low impedance path for oscillator signals between the line and neutral conductors. It should be appreciated that the preferred embodiment showing the connection of capacitor 77 between terminals 90 and 91 is by way of example. Capacitor 77 may also be connected across terminals 15 and 17. In addition, an example of the power switch includes a Triac $D_7$ and relay coil $L_4$ which operate in response to a 60 Hz AC input signal and a DC bias signal. If desired, the switching circuit 26 could also comprise a prior art arrangement of transistors or diodes which operate in response to a DC bias signal applied to terminal 86 from a DC bias source to provide a conductive path to the load $Z_L$ in the absence of leakage current so that an AC input signal is not required to operate the power switch 26. Thus, many other arrangements can readily be devised in accordance with the disclosed principle by those skilled in the art.

What is claimed as new and desired to be secured by Letters Patent of the United States is:

1. A ground fault interrupter circuit for interrupting signals at a first frequency conducted to a load from a source in the presence of a path to ground for leakage current, said ground fault interrupter circuit comprising:
    oscillator means for generating signals at a second frequency, said oscillator means having feedback means including a parallel circuit with a predetermined Q at said second frequency, said parallel circuit being formed by a first capacitor coupled in parallel with first, second, and third conductors having an inductive impedance tuned to be resonant at said second frequency by said first capacitor, said first and second conductors having input terminals for receiving said signals at said first frequency and output terminals for coupling to said load;
    a second capacitor coupled between said first and second conductors to provide a low impedance path for signals at said second frequency and a high impedance path for signals at said first frequency, said predetermined Q of said parallel circuit being reduced when signals at said second frequency are conducted along a continuous path including said first and second conductors, said second capacitor and a path for said leakage current from said first conductor to said ground; and
    switching means coupled to said first and second conductors for interrupting signals conducted from said source to said load when said predetermined Q of said resonant circuit is reduced.

2. A ground fault interrupter circuit in accordance with claim 1, further including said predetermined Q of said parallel circuit being reduced when signals at said second frequency are conducted along a continuous path including said second conductor and a path for said leakage current from said second conductor to said ground.

3. A ground fault interrupter circuit comprising:
    oscillator means for generating h.f. signals, said oscillator means having feedback means including a parallel circuit with a predetermined Q at a selected h.f. frequency, said parallel circuit being formed by a first capacitor coupled in parallel with first, second, and third conductors having an inductive impedance tuned to be resonant at said selected h.f. frequency by said first capacitor, said first and second conductors having input terminals for receiving signals at a first frequency and output terminals for coupling to a load;
    a second capacitor coupled between said first and second conductors to provide a low impedance path for signals at said selected h.f. frequency, said predetermined Q of said parallel circuit being reduced when signals at said selected h.f. frequency are conducted along a continuous path including said first and second conductors, said second capacitor, and a conductive path for leakage current from said first conductor to ground; and
    means responsive to said h.f. signals for interrupting signals at said first frequency being coupled to said load when said predetermined Q is reduced.

4. A ground fault interrupter circuit in accordance with claim 3, further including said predetermined Q of said parallel circuit being reduced when signals at said h.f. frequency are conducted along a continuous path including said second conductor and a conductive path for said leakage current from said second conductor to ground.

* * * * *

UNITED STATES PATENT OFFICE
CERTIFICATE OF CORRECTION

PATENT NO. : 4,052,751
DATED : October 4, 1977
INVENTOR(S) : Marshall Howard Shepard It is certified that error appears in the above-identified patent and that said Letters Patent are hereby corrected as shown below:

Column 2, line 10, after "terminals" insert --15 and 17 to source 12 output terminals--.

Column 3, line 3, change "23" to --24--.

Column 4, line 9, change "condition" to --conduction--.

Column 4, line 49, change "FIG. 1" to --FIG. 2--.

Column 5, line 27, after "defined" change "at" to --as--.

Column 8, line 2, change "voltge" to --voltage--.

Signed and Sealed this

Twenty-first Day of February 1978

[SEAL]

Attest:

RUTH C. MASON
Attesting Officer

LUTRELLE F. PARKER
Acting Commissioner of Patents and Trademarks